(12) United States Patent
Kawakami et al.

(10) Patent No.: US 6,897,912 B2
(45) Date of Patent: May 24, 2005

(54) LIQUID CRYSTAL DEVICE AND ELECTRONIC DEVICE

(75) Inventors: Hisanori Kawakami, Matsumoto (JP); Kogo Endo, Chino (JP)

(73) Assignee: Seiko Epson Corporation (JP)

( * ) Notice: Subject to any disclaimer, the term of this patent is extended or adjusted under 35 U.S.C. 154(b) by 46 days.

(21) Appl. No.: 09/863,059

(22) Filed: May 22, 2001

(65) Prior Publication Data

US 2002/0008805 A1 Jan. 24, 2002

(30) Foreign Application Priority Data

May 23, 2000 (JP) ........................................ 2000-151666

(51) Int. Cl.⁷ ...................... G02F 1/1335; G02F 1/1345
(52) U.S. Cl. ............................ 349/61; 349/62; 349/151
(58) Field of Search ..................... 349/61, 62, 149–152; 345/80, 90; 362/31, 26

(56) References Cited

U.S. PATENT DOCUMENTS

| 149,074 | A | * | 3/1874 | Imaeda ........................ 257/432 |
| 5,708,428 | A | | 1/1998 | Phillips |
| 5,852,483 | A | | 12/1998 | Newstead et al. |
| 5,876,107 | A | | 3/1999 | Parker et al. |
| 5,974,213 | A | * | 10/1999 | Maruchi et al. ............... 385/39 |
| 6,025,644 | A | * | 2/2000 | Imaeda ........................ 257/723 |
| 6,222,597 | B1 | * | 4/2001 | Muramatsu ................... 349/58 |
| 6,315,440 | B1 | * | 11/2001 | Satoh ........................ 362/561 |

FOREIGN PATENT DOCUMENTS

| JP | 01-219823 | A | | 9/1989 | |
| JP | 05-090450 | U | | 12/1993 | |
| JP | 11-344705 | A | | 12/1999 | |
| JP | 2000-075316 | A | | 3/2000 | |
| JP | 2000-98415 | | * | 4/2000 | ......... G02F/1/1345 |
| JP | 2000098415 | | | 4/2000 | |
| JP | 2001-264751 | A | | 9/2001 | |

OTHER PUBLICATIONS

Communication from Japanese Patent Office re: counterpart application.
Communication from Korean Patent Office regarding counterpart application.
Korean Examination Report.
European Search Report.

* cited by examiner

Primary Examiner—Tarifur R. Chowdhury
Assistant Examiner—Mike Qi
(74) Attorney, Agent, or Firm—Harness, Dickey & Pierce, P.L.C.

(57) ABSTRACT

A liquid crystal 1 includes a pair of substrates 7a and 7b which hold a liquid crystal L therebetween, a light guide 4 provided opposite to one of the substrates, a FPC 3a connected to one of the substrates 7a and 7b, and a LED 21 provided opposite to a light receiving surface 4a of the light guide 4. The LED 21 is mounted on the FPC 3a and arranged opposite to the light receiving surface 4a of the light guide 4. The LED 21 is preferably positioned relative to the light guide 4 by engagement between the pines provided on the LED 21 and the recesses 31 provided on the light guide 4.

10 Claims, 13 Drawing Sheets

LIQUID CRYSTAL DEVICE AND ELECTRONIC DEVICE

BACKGROUND OF THE INVENTION

1. Technical Field of the Invention

The present invention relates to a liquid crystal device in which light transmitted through a liquid crystal is modulated by controlling the orientation of the liquid crystal to display an image. The present invention also relates to an electronic device using the liquid crystal device.

2. Description of the Related Art

Recently, liquid crystal devices have widely been used for electronic devices such as a computer, and a cell phone. The liquid crystal device generally comprises a liquid crystal sandwiched between a pair of substrates each comprising an electrode so that the orientation of the liquid crystal is controlled by applying a voltage between both electrodes to modulate light transmitted through the liquid crystal, to display an image.

On the basis of the system for supplying light to the liquid crystal, various known liquid crystal devices are distinguished into a reflective liquid crystal device having a structure in which external light is reflected by a reflector plate provided on the outer surface or the inner surface of one of substrates, a transmissive liquid crystal device having a structure in which light is supplied to the liquid crystal in a planar manner by using an illuminating device provided outside one of the substrates, and a transflective liquid crystal device which functions as a reflective type when external light is incident, and functions as a transmissive type when external light is insufficient.

As the liquid crystal device on a system in which light is supplied to the liquid crystal by using the illuminating device, such as the transmissive liquid crystal device, or the transflective liquid crystal device, a liquid crystal device is conventionally known, in which a light emitting device such as LED (light emitting diode), or the like is used as a light emission source. In the liquid crystal device on this system, the light emitting device is mounted on a non-flexible substrate such as a glass epoxy substrate, and the non-flexible substrate is mounted on a housing of a light guide so that the light emitting device is arranged opposite to the light receiving surface of the light guide.

However, the conventional liquid crystal device having the above-described structure has the need to use a dedicated non-flexible substrate for the light emitting device and the need to form a structure for supporting the non-flexible substrate, thereby causing the problem of increasing the cost, complicating the structure and failing to achieve a small liquid crystal device.

The present invention has been achieved in consideration of the above problem, and a first object of the present invention is to simplify a supporting structure for a light emitting device to achieve a small liquid crystal device at low cost.

A second object of the present invention is to prevent deviation of the position of a light emitting device relative to a light guide to prevent the occurrence of variation in the efficiency of light incidence on the light guide even when a supporting structure for the light emitting device is simplified, thereby preventing the occurrence of variation in the light supplied to a liquid crystal.

SUMMARY OF THE INVENTION

In order to achieve the first object, in accordance with a first aspect of the present invention, a liquid crystal device comprises a pair of substrates which hold a liquid crystal therebetween, a light guide provided opposite to one of the substrates, a flexible substrate connected to one of the substrates, and a light emitting device provided opposite to a light receiving surface of the light guide, wherein the light emitting device is mounted on the flexible substrate and arranged opposite to the light receiving surface of the light guide.

In this liquid crystal device, the light emitting device is provided on the flexible substrate (FPC: Flexible Printed Circuit) connected to one of the substrates which holds the liquid crystal therebetween. The flexible substrate is used for electrical wiring of some components to the liquid crystal, not for mounting the light emitting device to the light guide. Therefore, in the present invention, a supporting structure for the light emitting device can be greatly simplified to achieve reductions in the cost and size of the liquid crystal device.

In the liquid crystal device in accordance with the first aspect of the present invention, the flexible substrate is preferably bent along the light receiving surface of the light guide so that the light emitting device is arranged opposite to the light receiving surface. In many cases, a control substrate is provided separately from the pair of substrates, for controlling an operation of the liquid crystal held between the pair of substrates. In many cases, the flexible substrate is bent along the light receiving surface of the light guide and then connected to the control substrate. Therefore, the light emitting device is preferably arranged opposite to the light receiving surface at the time the flexible substrate is bent along the light receiving surface of the light guide.

In the liquid crystal device in accordance with the first aspect of the present invention, the flexible substrate has a terminal to be connected to one of the substrates, the light emitting device provided on the same surface of the flexible substrate as the surface where the terminal is provided, and a wiring pattern provided on the surface opposite to the surface where the light emitting device is provided, the wiring pattern being preferably connected to the terminal through a through hole. In this construction, the wiring pattern is absent from the surface of the flexible substrate, on which the light emitting device is provided, and thus the position where the light emitting device is provided can freely be selected. Also, the wiring pattern is not hindered by the light emitting device, and thus the pattern design can easily be made.

In the liquid crystal device in accordance with the first aspect of the present invention, the flexible substrate has the terminal to be connected to the substrate, and the wiring pattern formed on the same surface as the surface on which the terminal is provided, and the light emitting device may be provided on the same surface of the flexible substrate as the surface on which the wiring patter is provided.

In the liquid crystal device of the present invention having the structure in which the light emitting device is provided on the same surface of the flexible substrate as the surface on which the wiring pattern is provided, the wiring pattern is preferably provided on the flexible substrate to avoid the light emitting device. This can prevent the occurrence of a trouble in the wiring pattern even when the light emitting device is provided on the flexible substrate.

In the liquid crystal device in accordance with the first aspect of the present invention, the light emitting device may be provided on the flexible substrate so that the light emitting surface is located at the side of the surface mounted to the flexible substrate. In this case, the side serving as the light emitting surface is arranged opposite to the light receiving surface of the light guide. As shown in FIG. 10, this construction can form a wide space R on the side of the light emitting device opposite to the light emitting surface so that the space R can be used for containing, for example, a chip capacitor and other electronic parts.

In the liquid crystal device in accordance with the first aspect of the present invention, the light guide can be formed in a bent shape so that the light receiving surface thereof faces to the direction opposite to the pair of substrates, and the light emitting surface of the light emitting device can be arranged opposite to the light receiving surface facing to the direction opposite to the pair of substrates. In this construction, as shown in FIG. 9, a wide space R can be formed between the light guide and the flexible substrate so that the space R can be used for containing, for example, a chip capacitor and other electronic parts.

In the liquid crystal device in accordance with the first aspect of the present invention, use of the flexible substrate is not limited to the specified application, but it is preferably used for supplying a signal for driving the liquid crystal.

In order to achieve the second object, in accordance with a second aspect of the present invention, a liquid crystal device comprises a pair of substrates which hold a liquid crystal therebetween, a light guide provided opposite to one of the substrates, a flexible substrate connected to one of the substrates, and a light emitting device provided opposite to a light receiving surface of the light guide, wherein the light emitting device is mounted on the flexible substrate and arranged opposite to the light receiving surface, and positioning means is provided between the light emitting device and the light receiving surface of the light guide, for positioning the light emitting device.

The liquid crystal device in accordance with the second aspect of the present invention is different from the liquid crystal device in accordance with the first aspect in that the light emitting device is provided on the flexible substrate and arranged opposite to the light receiving surface of the light guide, and the positioning means is provided between the light emitting device and the light receiving surface of the light guide, for positioning the light emitting device.

In the liquid crystal device in accordance with the second aspect of the present invention, the light emitting device is provided on the flexible substrate and arranged opposite to the light receiving surface of the light guide, to greatly simplify a supporting structure for the light emitting device, thereby achieving reductions in the cost and size of the liquid crystal device.

Furthermore, the positioning means can prevent deviation of the position of the light emitting device relative to the light guide even when the supporting structure for the light emitting device is simplified. Therefore, the occurrence of variation in the efficiency of light incidence on the light guide can be prevented, thereby preventing the occurrence of variation in the light supplied to a liquid crystal.

In the liquid crystal device in accordance with the second aspect of the present invention, the positioning means preferably comprises a projecting portion provided on one of the light emitting device and the light guide, and a recessed portion provided on the other to be engaged with the projecting portion. The projecting portion may comprise a cylindrical pin or a triangular prism projection.

In the liquid crystal device in accordance with the second aspect of the present invention, the flexible substrate is preferably bent along the light receiving surface of the light guide so that the light emitting device is arranged opposite to the light receiving surface. In many cases, a control substrate is provided separately from the pair of substrates, for controlling an operation of the liquid crystal held between the pair of substrates. In many cases, the flexible substrate is bent along the light receiving surface of the light guide and then connected to the control substrate. Therefore, the light emitting device is preferably arranged opposite to the light receiving surface at the time the flexible substrate is bent along the light receiving surface of the light guide.

In the liquid crystal device in accordance with the second aspect of the present invention, the flexible substrate has a terminal to be connected to one of the substrates, the light emitting device provided on the same surface of the flexible substrate as the surface where the terminal is provided, and a wiring pattern provided on the surface opposite to the surface where the light emitting device is provided, the wiring pattern being preferably connected to the terminal through a through hole. In this construction, the wiring pattern is absent from the surface of the flexible substrate, on which the light emitting device is provided, and thus the position where the light emitting device is provided can freely be selected. Also, the wiring pattern is not hindered by the light emitting device, and thus the pattern design can easily be made.

In the liquid crystal device in accordance with the second aspect of the present invention, the flexible substrate has the terminal to be connected to one of the substrates, and the wiring pattern formed on the same surface as the surface on which the terminal is provided, and the light emitting device can be provided on the same surface of the flexible substrate as the surface on which the wiring patter is provided.

In the liquid crystal device in accordance with the second aspect of the present invention having the structure in which the light emitting device is provided on the same surface of the flexible substrate as the surface on which the wiring pattern is provided, the wiring pattern is preferably provided on the flexible substrate to avoid the light emitting device. This can prevent the occurrence of a trouble in the wiring pattern even when the light emitting device is provided on the flexible substrate.

In the liquid crystal device in accordance with the second aspect of the present invention, the light emitting device can be provided on the flexible substrate so that the light emitting surface is located at the side of the surface mounted to the flexible substrate. In this case, the side serving as the light emitting surface is arranged opposite to the light receiving surface of the light guide. As shown in FIG. 10, this construction can form a wide space R on the side of the light emitting device opposite to the light emitting surface so that the space R can be used for containing, for example, a chip capacitor and other electronic parts.

In the liquid crystal device in accordance with the second aspect of the present invention, the light guide may be formed in a bent shape so that the light receiving surface thereof faces to the direction opposite to the pair of substrates, and the light emitting surface of the light emitting device may be arranged opposite to the light receiving surface facing to the direction opposite to the pair of substrates. In this construction, as shown in FIG. 9, a wide space R can be formed between the light guide and the flexible substrate so that the space R can be used for containing, for example, a chip capacitor and other electronic parts.

In the liquid crystal device in accordance with the second aspect of the present invention, use of the flexible substrate is not limited to the specified application, but it is preferably used for supplying a signal for driving the liquid crystal.

An electronic device of the present invention comprises a liquid crystal device, and a control circuit for controlling an operation of the liquid crystal device, wherein the liquid crystal device is the liquid crystal device in accordance with the first or second aspect of the present invention, and the flexible substrate is connected to the control circuit so that the light emitting device is arranged opposite to the light receiving surface of the light guide with the flexible substrate connected to the control circuit.

In this electronic device using the liquid crystal device in accordance with the first aspect of the present invention, the structure around the light emitting device used as an illumination light source in the liquid crystal device is significantly simplified and decreased in size, thereby facilitating structural design of the electronic device.

In use of the liquid crystal device in accordance with the second aspect of the present invention, even when the structure around the light emitting device is simplified, as described above, the positioning means can prevent deviation of the position of the light emitting device relative to the light guide to prevent the occurrence of variation in the efficiency of light incidence on the light guide, thereby preventing the occurrence of variation in the light supplied to the liquid crystal. As a result, it is possible to securely prevent the occurrence of variation in brightness of an image displayed on a display area comprising the liquid crystal device from product to product in the electronic device, whereby many electronic devices with constant display quality can be stably manufactured.

BRIEF DESCRIPTION OF THE DRAWINGS

FIG. 4 is a drawing showing the structure of one pixel in the liquid crystal panel shown in FIG. 3, in which

DETAILED DESCRIPTION OF THE PREFERRED EMBODIMENTS

According to the driving system, liquid crystal devices are possibly distinguished into an active matrix system liquid crystal device in which pixel electrodes are driven by switching elements (namely, nonlinear elements), and a passive matrix system liquid crystal device in which pixel electrodes are formed in a simple matrix arrangement without using switching elements. In comparison between both devices, the active matrix system is thought to be advantageous from the viewpoint of good contrast and responsiveness, and ease of achievement of a high-definition display.

Known systems of the active matrix system liquid crystal device include a system using a three-terminal element such as a thin film transistor (TFT) as a switching element, and a system using a two-terminal element such as a thin film diode (TFD). Of both systems, the liquid crystal device using TFDs has the advantages that no short-circuit defect occurs between wirings because there is no intersection between the wirings, and that the film deposition step and the photolithography step can be abbreviated.

An embodiment of the present invention will be descried below with reference to an example in which the first or second aspect of the present invention is applied to an active matrix type liquid crystal device having a structure using TFDs as switching elements for pixel electrodes. In this embodiment, a liquid crystal device is a transflective liquid crystal device which functions as a reflective type when external light is incident, and functions as a transmissive type when external light is insufficient.

Figure 1:
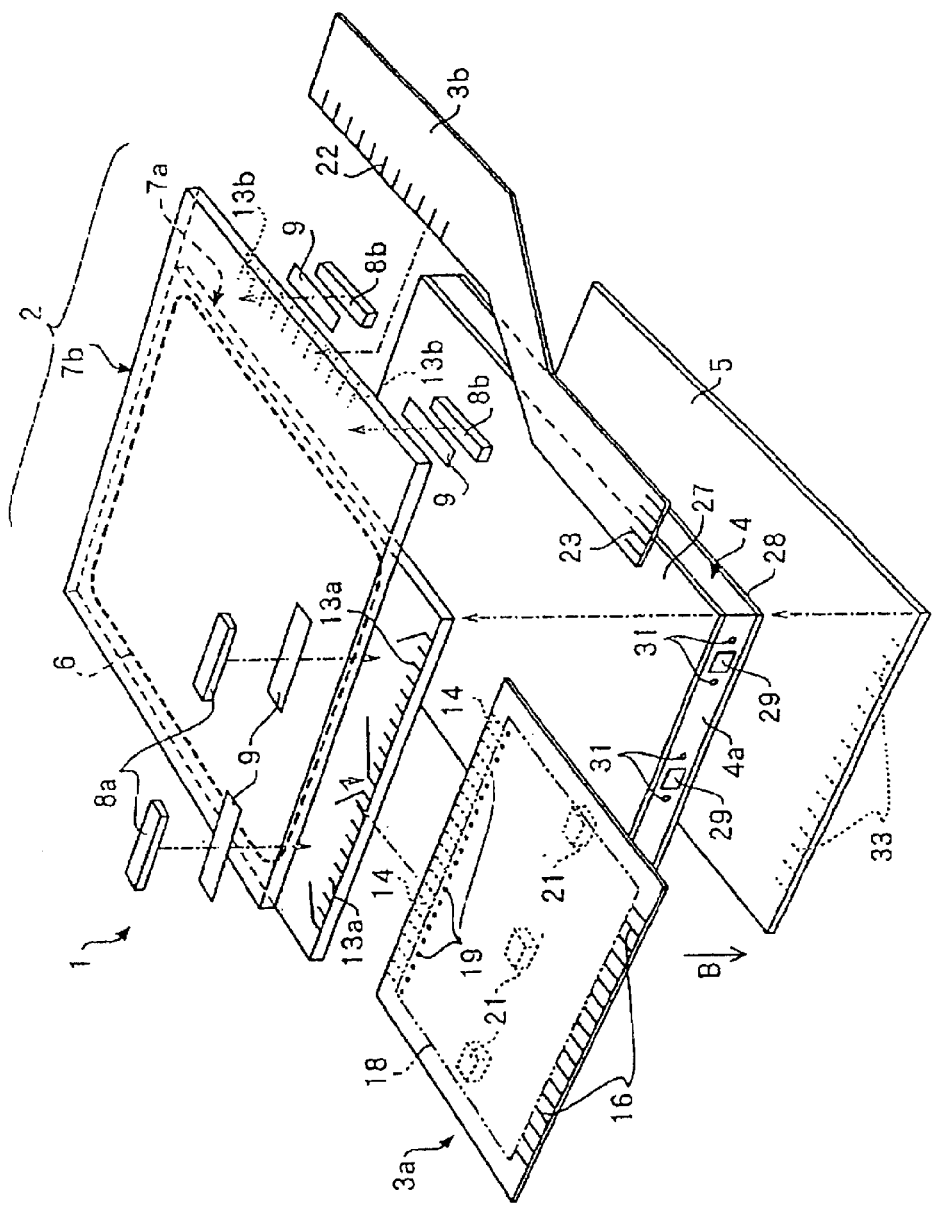
FIG. 1 is a perspective view showing a liquid crystal device in an exploded state in accordance with an embodiment of the present invention.

FIG. 1 is a liquid crystal device 1 in accordance with the embodiment. The liquid crystal device 1 comprises a liquid crystal panel 2 to which FPC (Flexible Printed Circuit: flexible substrate) 3a and FPC 3b are connected, and a light guide 4 mounted to the non-display side (the lower side in FIG. 1) of the liquid crystal panel 2. Furthermore, a control substrate 5 is provided on the side of the light guide 4 opposite to the liquid crystal panel 2 side. The control substrate 5 is used as a component of the liquid crystal device, or a component of an electronic device to which the liquid crystal device is mounted, according to circumstances. In this embodiment, the FPCs 3a and 3b are used for electrically connecting the liquid crystal panel 2 and the control substrate 5.

The liquid crystal panel 2 comprises a pair of substrates 7a and 7b which are bonded together with a sealing ring material 6. Liquid crystal driving ICs 8a are mounted on the surface of the portion of the first substrate 7a, which projects from the second substrate 7b, with AFC (Anisotropic Conductive Film) 9. Liquid crystal driving ICs 8b are mounted on the surface of the portion of the second substrate 7b, which projects from the first substrate 7a, with the AFC 9.

The liquid crystal device of this embodiment is an active matrix system liquid crystal device using the TFDs as the switching elements, and one of the first substrate 7a and the second substrate 7b is an element substrate, the other being a counter substrate. In this embodiment, the first substrate 7a is considered as the element substrate, and the second substrate 7b is considered as the counter substrate.

Figure 2:
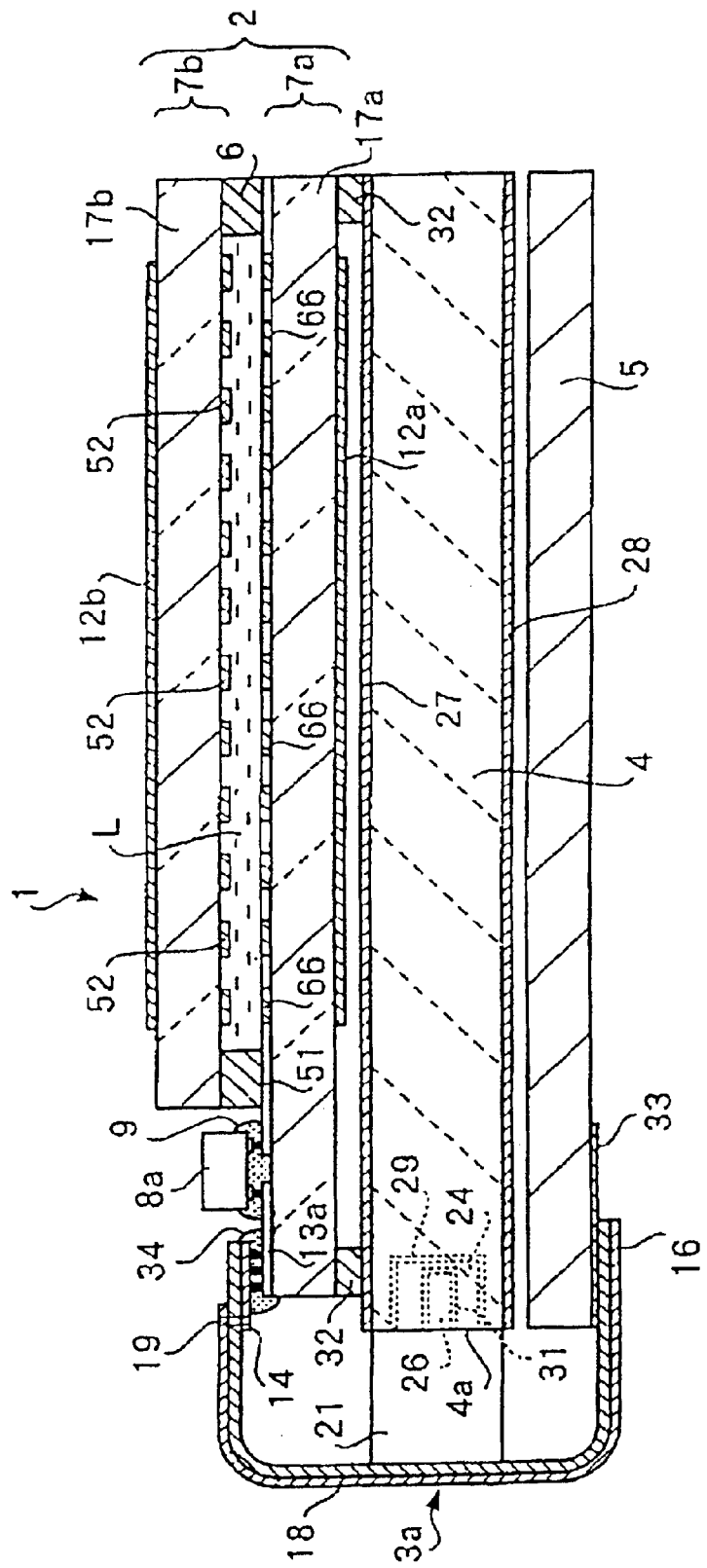
FIG. 2 is a sectional view showing the sectional structure of the liquid crystal device shown in FIG. 1.

As shown in FIG. 2, pixel electrodes 66 are formed on the inner side of the first substrate 7a serving as the element substrate, and a polarizer 12a is bonded to the outer side thereof. In addition, data lines 52 are formed on the inner side of the second substrate 7b serving as the counter substrate, and a polarizer 12b is bonded to the outer side thereof. A liquid crystal L is sealed in a gap, i.e., a so-called cell gap, surrounded by the first substrate 7a, the second substrate 7b and the sealing material 6.

Although not shown in FIG. 2, various optical elements other than the above elements are provided on the first substrate 7a and the second substrate 7b according to demand. For example, an alignment film is provided on the inner side of each of the substrates, for aligning the orientation of the liquid crystal L. Each of the alignment films is formed by, for example, coating a polyimide solution and then burning the coating. The polymer main chains of the polyimide are stretched in the predetermined direction by rubbing to orient the molecules of the liquid crystal L sealed in the cell gap along the stretching direction of the alignment film.

In a color display, color filters of the primary colors including R (red), G (green) and B (blue) are formed in a predetermined arrangement on the portions of the counter substrate which are opposed to the pixel electrodes formed on the element substrate, and a black matrix of Bk (black) is formed on the regions which are not opposed to the pixel electrodes. In order to smooth and protect the surfaces of the color films and the black matrix, a smoothing film is further coated. A counter electrode provided on the counter substrate is formed on the smoothing layer.

Figure 3:
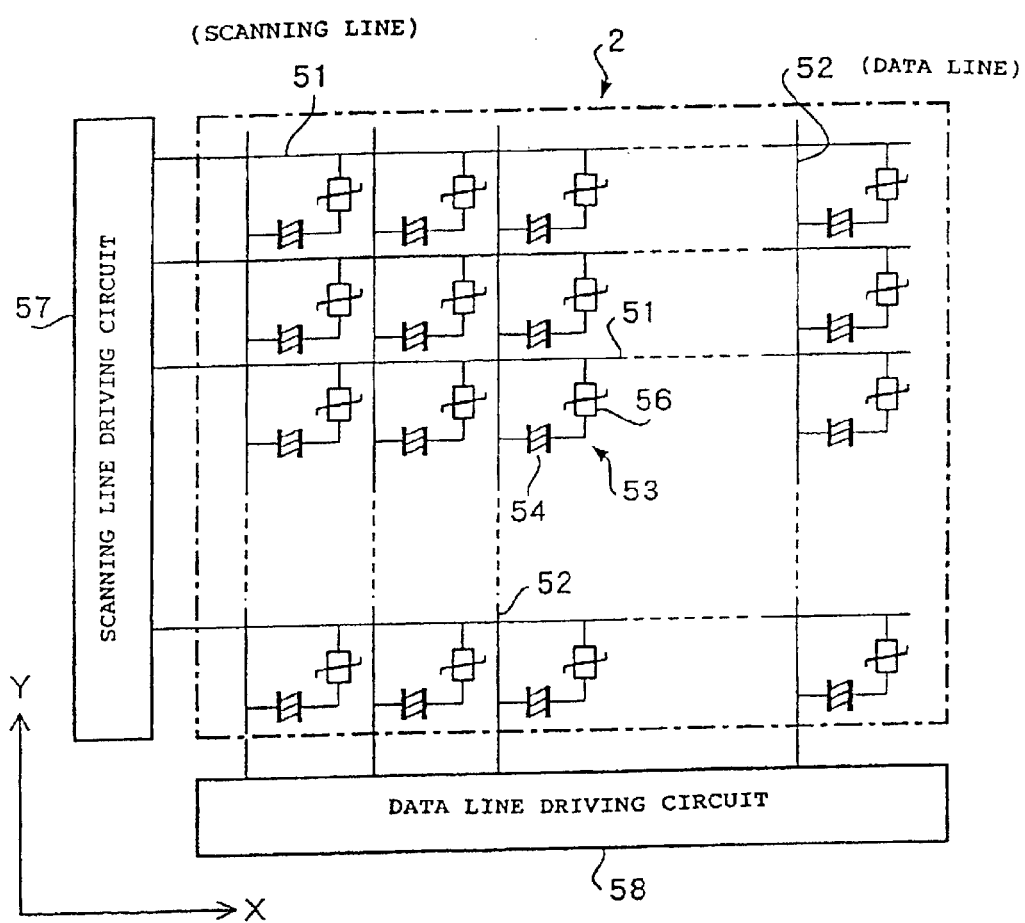
FIG. 3 is a drawing schematically showing the electric construction of a liquid crystal panel which constitutes the liquid crystal device shown in FIG. 1.

FIG. 3 schematically shows the electric construction of the liquid crystal panel 2. As shown in FIG. 3, a plurality of scanning lines 51 are formed in the line direction (X direction) on the liquid crystal panel 2, and a plurality of data lines 52 are formed in the column direction (Y direction), a pixel 53 being formed at each of the intersections of the scanning lines 51 and the data lines 52. Each of the pixels 53 is formed by series connection of the liquid crystal layer 54 and the TFD (Thin Film Diode).

The scanning lines 51 are driven by a scanning line driving circuit 57, and the data lines 52 are driven by a data line driving circuit 58. In this embodiment, the scanning line driving circuit 57 is included in the liquid crystal driving ICs 8a, and the data line driving circuit 58 is included in the liquid crystal driving ICs 8b shown in FIG. 1.

In FIG. 3, the scanning lines 51 and the TFDs 56 are formed on the inner side of the element substrate 7a shown in FIG. 2, and the pixel electrodes 66 formed on the inner side of the element substrate 7a are connected to the scanning lines 51. On the other hand, in FIG. 3, the data lines 52 are formed as stripe electrodes on the inner side of the counter substrate 7b shown in FIG. 2. The element substrate 7a and the counter substrate 7b are combined together so that the pixel electrodes 66 on one line have an opposed positional relation to one data line 52. Therefore, the liquid crystal layer 54 comprises the data lines 52 and the pixel electrodes 66, and the liquid crystal L held therebetween.

The data lines 52 are made of a transparent conductive material, for example, such as ITO (Indium Tin Oxide). The pixel electrodes 66 are made of a reflecting material such as Al (aluminum). In FIG. 3, the TFDs 56 are connected to the scanning lines 51, and the liquid crystal layer 54 is connected to the data lines 52. However, conversely, the TFDs 56 may be connected to the data lines 52, and the liquid crystal layer 54 may be connected to the scanning lines 51.

Figure 4A:
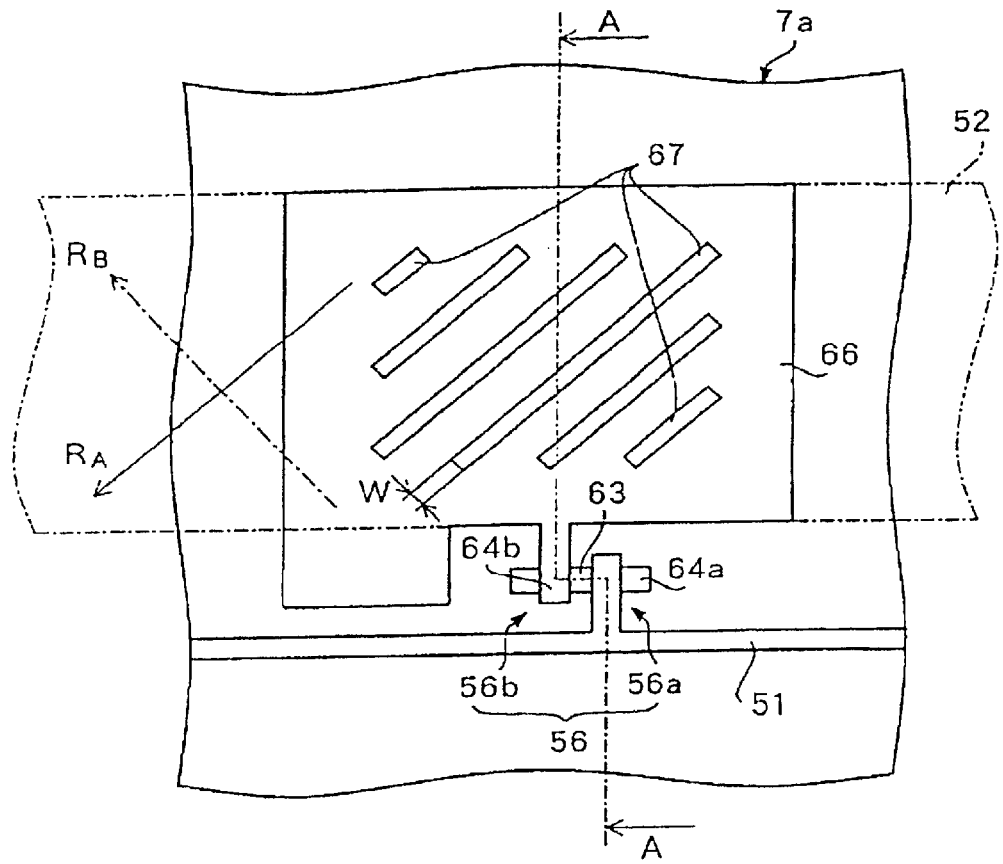
FIG. 4(a) is a plan view.
Figure 4B:
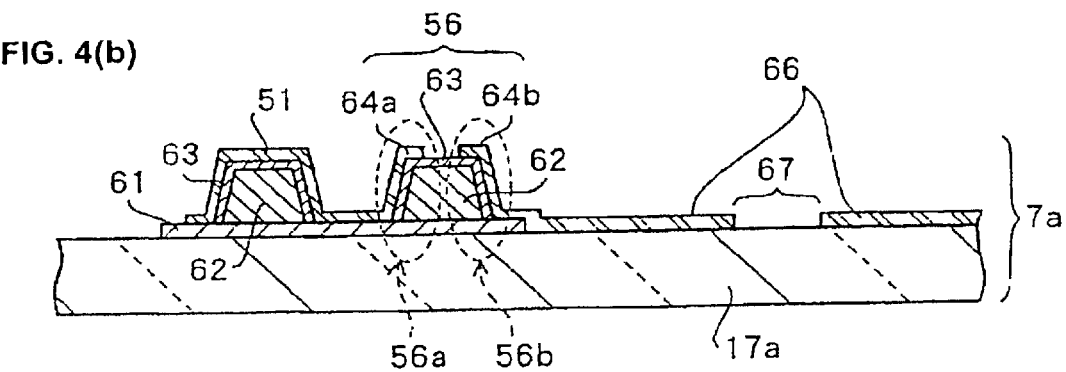
FIG. 4(b) is a sectional view taken along line A—A in FIG. 4(a).

FIG. 4 shows the construction of each pixel in the element substrate 7a. Particularly, FIG. 4(a) shows the planar structure of each pixel, and FIG. 4(b) shows the sectional structure taken along line A—A in FIG. 4(a). In both drawings, the TFD 56 comprises two TFD portions including a first TFD 56a and a second TFD 56b both of which are formed on an insulating film 61 deposited on the surface of the element substrate 7a. The insulating film 61 is made of, for example, tantalum oxide ($Ta_2O_5$) having a thickness of about 50 to 200 nm.

The TFDs 56a and 56b comprise a first metal film 62, an oxide film 63 formed on the surface of the first metal film 62 to function as an insulator, and second metal films 64a and 64b, respectively, formed on the surface of the oxide film 63 with a space therebetween. The oxide film 63 comprises tantalum oxide ($Ta_2O_5$) formed by, for example, oxidizing the surface of the first metal film 62 by an anodic oxidation method. In anodic oxidation of the first metal film 62, the surfaces of the base portions of the scanning lines 51 are also oxidized to form an oxide film comprising tantalum oxide.

As the thickness of the oxide film 63, a preferred value, for example, about 10 to 35 nm, is selected according to application. This thickness is a half of the thickness in a case in which one TFD is used for one pixel. The chemical solution used for anodic oxidation is not limited, and for example, 0.01 to 0.1% by weight of citric acid aqueous solution can be used.

The second metal films 64a and 64b are formed by depositing a reflecting material, for example, such as Al (aluminum) or the like by using a deposition method such as sputtering, and then pattering the deposited film by photolithography and etching processes to form a film having a thickness of about 50 to 300 nm. The second metal film 64a is used as each of the scanning lines 51, and the other second metal film 64b is connected to each of the pixel electrodes 66.

The first TFD 56a has the laminated structure of second metal film 64a/oxide film 63/first metal film 62, i.e., the sandwich structure of metal/insulator/metal, in the order from the scanning line 51 side, and thus the current-voltage characteristic is non-linear in both the negative and positive directions. On the other hand, the second TFD 56b has the laminated structure of first metal film 62/oxide film 63/second metal film 64b in the order from the scanning line 51 side, and thus has the current-voltage characteristic opposite to the first TFD 56a. Therefore, the TFD 56 has a form in which two elements are connected in series in opposite directions to each other, and thus the current-voltage characteristic is symmetrized in both the negative and positive directions, as compared with a case in which one element is used.

The first metal film 62 is made of, for example, a tantalum single material, or a tantalum alloy. Although the thickness of the first metal film 62 is appropriately selected according to the application of the TFD 56, the thickness is usually about 100 to 500 nm. In use of a tantalum alloy for the first metal film 62, an element in the VI to VIII group in the periodic table, such as tungsten, chromium, molybdenum, rhenium, yttrium, lanthanum, or dysprosium, is added to tantalum as the main component. In this case, tungsten is preferred as the additive element, and the content is preferably, for example, 0.1 to 6% by weight.

The base 17a which constitutes the element substrate 7a is made of, for example, quartz, glass, or plastic, together with the base 17b (refer to FIG. 2) which constitutes the counter substrate 7b. In a simple reflective type, the element substrate base 17a is not necessarily transparent, while in this embodiment in which the device is used as both the reflective type and the transmissive type, the element substrate base 17a must be transparent.

The reasons for providing the insulating film 61 on the surface of the element substrate 7a are the following. First, the first metal film 62 is prevented from being separated from the underlying film by heat treatment after deposition of the second metal films 64a and 64b. Second, diffusion of impurities into the first metal film 62 is prevented. Therefore, when these points are insignificant, the insulating film 61 can be omitted.

The TFD 56 is an example of a two-terminal nonlinear element, and an element using a diode element structure, such as MSI (Metal Semi-Insulator), an element in which such elements are connected in series or parallel in opposite directions to each other, can also be used. When the current-voltage characteristic need not be strictly symmetrized in both the negative and positive directions, only one element can be used for forming the TFD.

In FIG. 4, the pixel electrode 66 formed by extending the second metal film 64b comprises a metal film of Al (aluminum) or the like with high reflectance. The pixel electrode 66 has the slit apertures 67 formed in an oblique direction as shown in FIG. 4(a). When the liquid crystal device functions as the transmissive type, light transmitted through the apertures 67 enter the liquid crystal layer 54 (refer to FIG. 3). The pixel electrode 66 preferably has the fine protrusions provided for scattering reflected light.

The liquid crystal panel 2 (refer to FIG. 1) comprises the element substrate 7a and the counter substrate 7b both of which are bonded together with a constant gap kept therebetween, and the liquid crystal L (refer to FIG. 2) sealed in the gap. In consideration of the visual performance of the liquid crystal panel, the direction of rubbing for imparting orientation to the liquid crystal L is set to the direction shown by arrow $R_A$ in FIG. 4(a) for the element substrate 7a, and to the direction shown by an arrow $R_B$ for the counter substrate 7b. Namely, with no voltage applied, the rubbing direction which determines the orientation direction of the liquid crystal molecules is the direction $R_B$ to the upper left at an angle of 45° for the counter substrate 7b which is located at the front as both substrates are viewed in a combined state from the counter substrate side, and the rubbing direction is the direction $R_A$ to the lower left at an angle of 45° for the element substrate 7a which is located at the back. Therefore, the slit direction of the apertures 67 formed in the element substrate 7a coincides with the rubbing direction $R_A$.

The rubbing process is generally performed by rubbing with a puff cloth wound on a roller in a predetermined direction to easily cause undesirable occurrence in the manufacturing process, such as the occurrence of static electricity, and various dust particles. In this embodiment, since the rubbing direction with the puff cloth coincides with the slit direction of the apertures 67, the influence of the steps formed by the pixel electrodes 66 can be reduced to suppress the occurrence of static electricity and various dust particles.

Although, in the above description, the second metal films 64a and 64b have the same composition as the pixel electrodes 66, the second metal films 64a and 64b may be formed by patterning a non-reflecting metal such as chromium, titanium, or molybdenum, and then the pixel electrodes 66 may be formed by patterning a reflecting metal such as Al.

Figure 5:
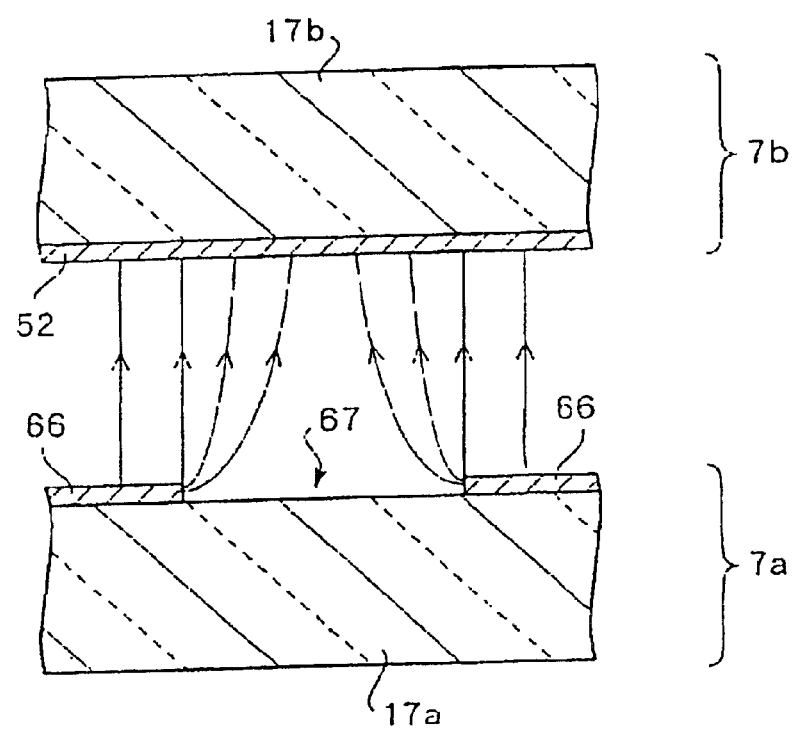
FIG. 5 is a sectional view showing the electric field direction in an element substrate.
Figure 6A:
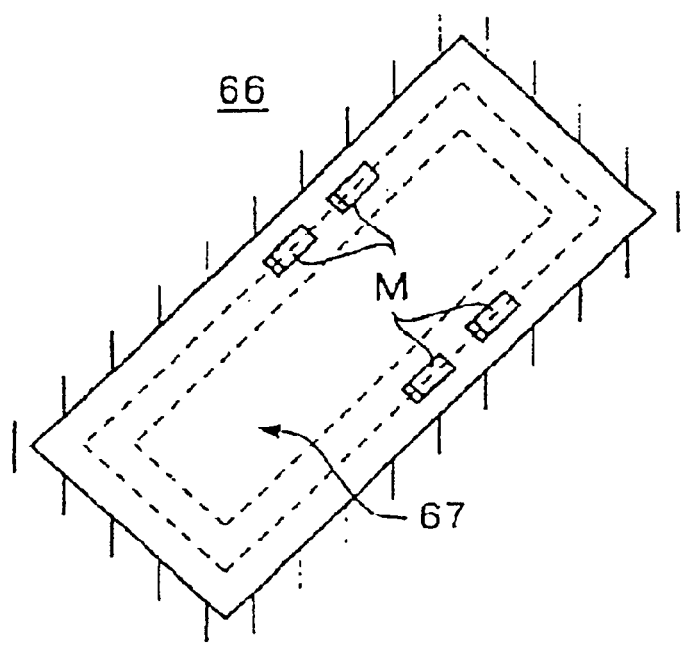
FIG. 6 is a drawing schematically showing the relation between the electric field strength and orientation of liquid crystal molecules in an element substrate.

As shown in FIG. 5, the direction of the electric field produced by the pixel electrode 66 and the data line 52 opposed thereto is perpendicular to the substrates in the regions other than the apertures 67, and thus the strength of the electric field is also uniform. On the other hand, since the electrode is absent from the apertures 67, an electric field occurs only due to leakage from the aperture ends of the pixel electrode 66. Therefore, the strength of the electric field near each of the apertures 67 decreases away from the aperture ends, and is thus nonuniform. Conversely, this means that the strength of the electric field is substantially constant at the points at equal distances from the side end of each of the apertures 67 formed in the pixel electrode 66, i.e., the points shown by broken lines in FIG. 6(a).

On the other hand, the rubbing direction of the element substrate 7a on which the pixel electrodes 66 are formed, coincides with the slit direction of the apertures 67 formed in the pixel electrodes 66, the liquid crystal molecules M on the element substrate 7a side are thus oriented in parallel with the side ends of the apertures 67 with no voltage applied. Therefore, when a potential difference occurs between the pixel electrodes 66 and the data lines 52, and particularly when the potential difference is small, the electric field strength at one end of each liquid crystal molecule M is equal to that at the other end, and thus the liquid crystal molecules M located in the apertures 67 tilt like the liquid crystal molecules M located in the region where the electrodes are present, i.e., the region which contributes to display when the device functions as the reflective type. Therefore, the rotatory direction of the light transmitted through the apertures 67 is substantially equal to the light reflected by the pixel electrodes 66, thereby decreasing a difference in display quality between the transmissive type and the reflective type.

Although, as described above, the slit direction of the apertures preferably coincides with the rubbing direction, the difference in display quality can be possibly decreased to a level causing no practical problem as long as the angle between the slit direction and the rubbing direction is in the range of ±15°.

Figure 6B:
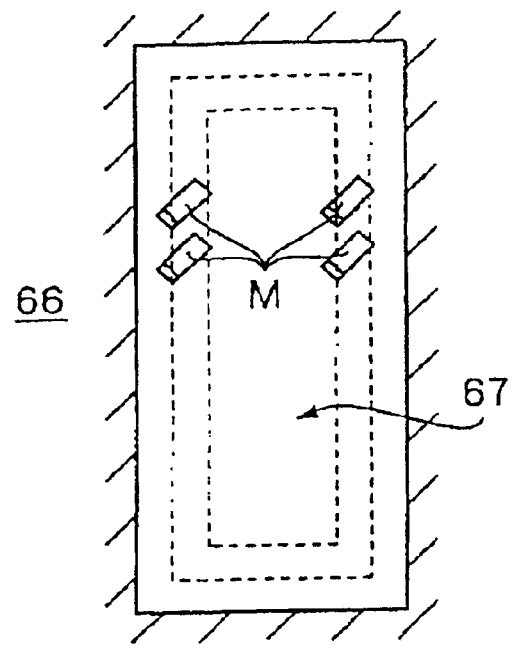

When the rubbing direction is different from the slit direction of the apertures 67, the liquid crystal molecules M located in the apertures 67 are oriented in the direction crossing the side ends of the apertures 67 with no voltage applied, as shown in FIG. 6(b). Therefore, even when a potential difference occurs between the pixel electrodes 66 and the data lines 52, particularly when the potential difference is small, the electric field strength at one end of each liquid crystal molecule M is different from that at the other end, and thus the liquid crystal molecules located in the apertures do not tilt like the liquid crystal molecules M located in the region which contributes to display when the device is used as the reflective type. As a result, the rotatory direction of the light transmitted through the apertures 67 is different from the light reflected by the pixel electrodes 66, thereby causing a difference in display quality between the transmissive type and the reflective type.

The width and area of each of the apertures 67 formed in the pixel electrodes 66 are described. When the liquid crystal sealed between a pair of substrates is a TN (Twisted Nematic) type, the distance between both substrates is generally several $\mu m$. In this case, for example, in a normally white display, even at the points at a distance of about 1.5 $\mu m$ from the ends of the intersections of the electrodes of both substrates, black display is made by the influence of a leakage electric field from one end of the periphery of each electrode with the voltage applied. On the basis of this, when the width of each of the slit apertures 67 shown in FIG. 4(a) is about 3 $\mu m$ or less, which is twice as long as 1.5 $\mu m$, the liquid crystal molecules in the apertures 67 tilt like the liquid crystal molecules in the regions where the electrodes are present. Conversely, when the width W of the slit apertures 67 is 3 μm or more, a dead space is formed in the pixel electrodes 66, in which the liquid crystal molecules M do not tilt according to the electric field in both the reflective type and the transmissive type. Therefore, the width W of the apertures 67 is possibly preferably 3 μm or less.

It is supposed that with the apertures 67 having a width W of 3 μm or less, a sufficient quality of light cannot be obtained for causing the device to function as the transmissive type unless a plurality of the apertures 67 are provided according to the size of the pixel electrodes 66. However, when many apertures 67 are provided to increase the total area, the quantity of transmitted light in use as the transmissive type is increased, while the quality of reflected light is accordingly decreased to darken a display screen in use as the reflective type. It was found from experiment that the transmissive display and the reflective display can be balanced well when the area of the apertures 67 is set to 10 to 25% of the area of the pixel electrodes 66. Strictly, the area of the pixel electrodes 66 means the area of the effective display regions which are the intersections of the pixel electrodes 66 and the data lines 52, and which are not shielded by the black matrix, or the like.

Returning to FIG. 1, a plurality of terminals 13a are formed on the projecting portion of the first substrate 7a serving as the element substrate. These terminals are formed at the same time the pixel electrodes 66 are formed on the region of the surface of the first substrate 7a, which is opposed to the second substrate 7b serving as the counter substrate. Also, a plurality of terminals 13b is formed on the projecting portion of the second substrate 7b. These terminals are formed at the same time the data lines 52 are formed on the region of the surface of the second substrate 7b, which is opposed to the first substrate 7a.

Each of the FPC 3a and the FPC 3b is formed by forming a metal film pattern having a desired pattern on a flexible base layer made of polyimide or another material. A plurality of terminals 22 is formed at a side end of the FPC 3b are conductively connected to the terminals 13b of the second substrate 7b by using a conductive adhesive element such as ACF. A plurality of terminals 23 formed at another side end of the FPC 3b is connected to the terminals (not shown) provided at a proper portion of the control substrate 5.

On the other hand, in the FPC 3a, a plurality of panel side terminals 14 are formed on the back side (the lower side shown in FIG. 1) at the liquid crystal panel side end, and a plurality of control substrate side terminals 16 are formed on the surface (the upper side shown in FIG. 1) at the side end opposite to the liquid crystal panel 2 side. Furthermore, a proper wiring pattern 18 is formed in a wide region of the surface of the FPC 3a so that one end of the wiring pattern 18 is connected directly to the control substrate side terminals 16, and the other end is connected to the panel side terminals 14 on the back side through through holes 19.

Figure 7A:
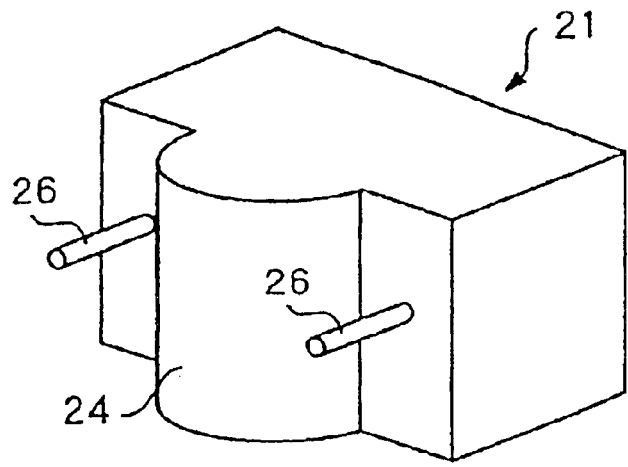
FIG. 7 is a perspective view showing light emitting devices in accordance with embodiments of the present invention.

Furthermore, a plurality of LEDs (Light Emitting Diode) 21 are mounted as light emitting devices on the back side of the FPC 3a, i.e., the side opposite to the wiring pattern 18 side, at appropriate intervals in a line, to constitute an illumination device in cooperation with the light guide 4. The wiring for these LEDs 21 is connected to the control substrate side terminals 16 through, for example, through holes. For example, as shown in FIG. 7(a), each of the LEDs 21 comprises pins 26 as positioning means provided on both sides of the light emitting surface 24 so that the light emitting surface 24 and the pins 26 face to the direction shown by an arrow B in FIG. 1, i.e., the direction opposite to the FPC 3a.

A diffusion plate 27 is mounted on the liquid crystal panel side surface of the light guide 4 by adhesion or the like, and a reflector plate 28 is mounted on the surface of the light guide 4, which is opposite to the liquid crystal panel side, by adhesion of the like. The reflector plate 28 reflects the light received by the light receiving surface 4a of the light guide to the liquid crystal panel 2. The diffusion plate 27 diffuses the light emitted from the light guide to the liquid crystal panel 2 with uniform planar strength.

A number of storage recesses 29 are provided on the light receiving surface 4a of the light guide 4 corresponding to the number of the LEDs 21 mounted on the FPC 3a, and positioning recesses 31 are provided on both sides of each of the storage recesses 29. Each of the positioning recesses 31 is formed with a size and a positional relation which permit insertion of the pins 26 formed on the light receiving surface 24 of each LED 21 mounted on the FPC 3a without looseness.

As shown in FIG. 2, the light guide 4 is mounted to the non-display side of the liquid crystal panel 2 with a buffer material 32 provided therebetween and made of rubber, plastic, or the like. The control substrate 5 is provided on the side of the light guide 4 opposite to the side on which the reflector plate 28 is mounted. The control substrate 5 is mounted as a component of the liquid crystal device 1 on the non-display side surface of the light guide 4 or as a component of an electronic device using the liquid crystal device 1. In addition, terminals 33 are formed at a side end of the control substrate 5, for connection with an external circuit.

In assembling the components of the liquid crystal device 1 shown in an exploded view of FIG. 1, as shown in FIG. 2, the liquid crystal panel side end of the FPC 3a is bonded to the projecting portion of the first substrate 7a with the ACF 34. By this bonding, the terminals 13a of the first substrate 7a are conductively connected to the terminals 14 of the FPC 3a with the conductive particles contained in the ACF 34. Then, the FPC 3a is bent along the light receiving surface 4a of the light guide 4, and in this bent state, the side end of the FPC 3a are overlapped with the side end of the control substrate 5. Then, the terminals 16 on the FPC 3a are connected to the terminals 33 on the control substrate 5 by soldering or another conductive connection method.

In bending the FPC 3a for conductive connection as described above, the light emitting surfaces 24 (refer to FIG. 7(a)) of the plurality of LEDs 21 mounted on the surface of the FPC 3a are contained in the storage recesses 29 formed on the light receiving surface 4a of the light guide 4, and the pins 26 provided on the light emitting surfaces 24 of the LEDs 21 are engaged with the positioning recesses 31. By this work, as shown in FIG. 2, the LEDs 21 are mounted to the light receiving surface 4a of the light guide 4 to form the illumination device for supplying light to the liquid crystal panel 2. Similarly, for the other FPC 3b shown in FIG. 1, the side end at which the terminals 23 are formed is conductively connected to the control substrate side terminals formed at a proper portion of the control substrate 5.

In the thus-formed liquid crystal device 1, in FIG. 2, when light is emitted from the LEDs 21, the light emitted from the light emitting surfaces 24 is introduced into the light guide 4, reflected by the reflector plate 28 to the liquid crystal panel 2, and then diffused by the diffusion plate 27 so that the diffused light is supplied with uniform planar strength to the liquid crystal panel 2. The component of the supplied light, which passes through the light guide side polarizer 12a, is supplied to the liquid crystal layer, and then modulated for each pixel by the liquid crystal having orientation which is controlled for each pixel according to a change in the voltage applied between the pixel electrodes 65 and the data lines 52. The modulated light is passed through the display side polarizer 12b to display an image on the outside.

As described above, in the liquid crystal device 1 of this embodiment, the LEDs 21 are supported by the FPC 3a for achieving electrical connection between the liquid crystal panel 2 and the control substrate 5 to eliminate a dedicated substrate for supporting the LEDs 21, thereby simplifying the support structure for the LEDs 21. Therefore, cost reduction and miniaturization of the liquid crystal device can be achieved.

Each of the LEDs 21 is always positioned at the constant position relative to the light receiving surface 4a of the light guide 4 by engagement between the pins 26 and the recesses 31, and the positions of the LEDs 21 are prevented from deviating relative to the light guide 4 during use of the liquid crystal device 1. Therefore, no variation occurs in display brightness of the liquid crystal panel 2 from product to product, and thus many liquid crystal devices 1 having uniform display performance can be stably manufactured.

In this embodiment, the LEDs 21 are mounted on the same surface of the FPC 3a as the liquid crystal panel side terminals 14, and the wiring pattern 18 of the FPC 3a is provided on the side opposite to the LED 21 side and connected to the terminals 14 through the through holes 19. Therefore, the wiring pattern 18 can be freely designed without being interfered with the LEDs 21.

Figure 8:
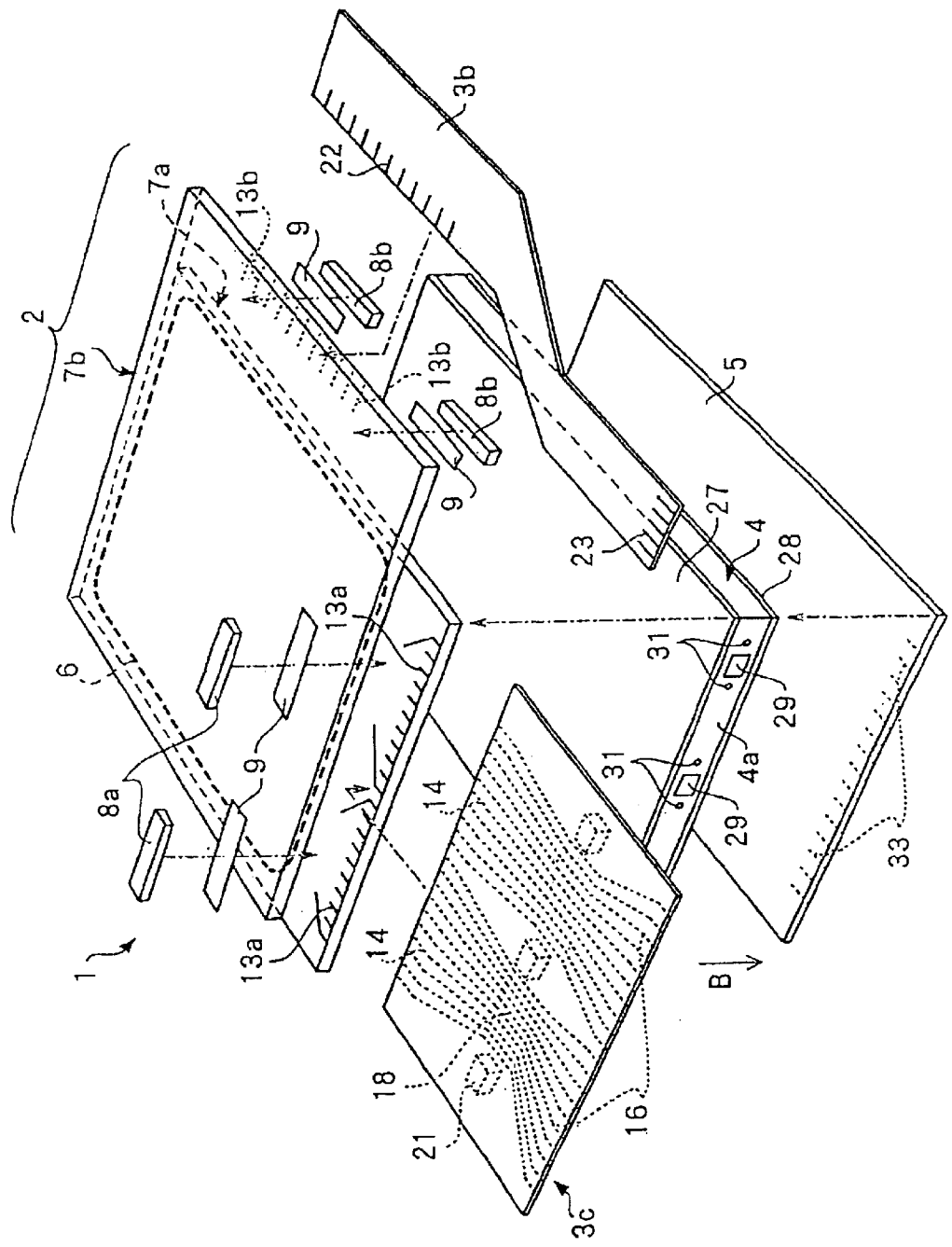
FIG. 8 is a perspective view showing a liquid crystal device in an exploded state in accordance with another embodiment of the present invention.

FIG. 8 shows a liquid crystal device in accordance with another embodiment of the present invention. In this embodiment, the same members as those shown in FIG. 1 are denoted by the same reference numerals, and the description thereof is omitted. The construction not shown in FIG. 8 is the same as that of the embodiment shown in FIG. 1.

This embodiment is different from the embodiment shown in FIG. 1 in that all the liquid crystal panel side terminals 14, the control substrate side terminals 16 and the wiring pattern 18 are formed on the same side of a FPC 3c used as the flexible substrate as the side on which the LEDs 21 are mounted, i.e., the lower side shown in FIG. 8. In this case, the wiring pattern 18 and the LEDs 21 cannot be arranged at the same positions, and thus the wiring pattern 18 is formed to avoid the LEDs 21.

Figure 9:
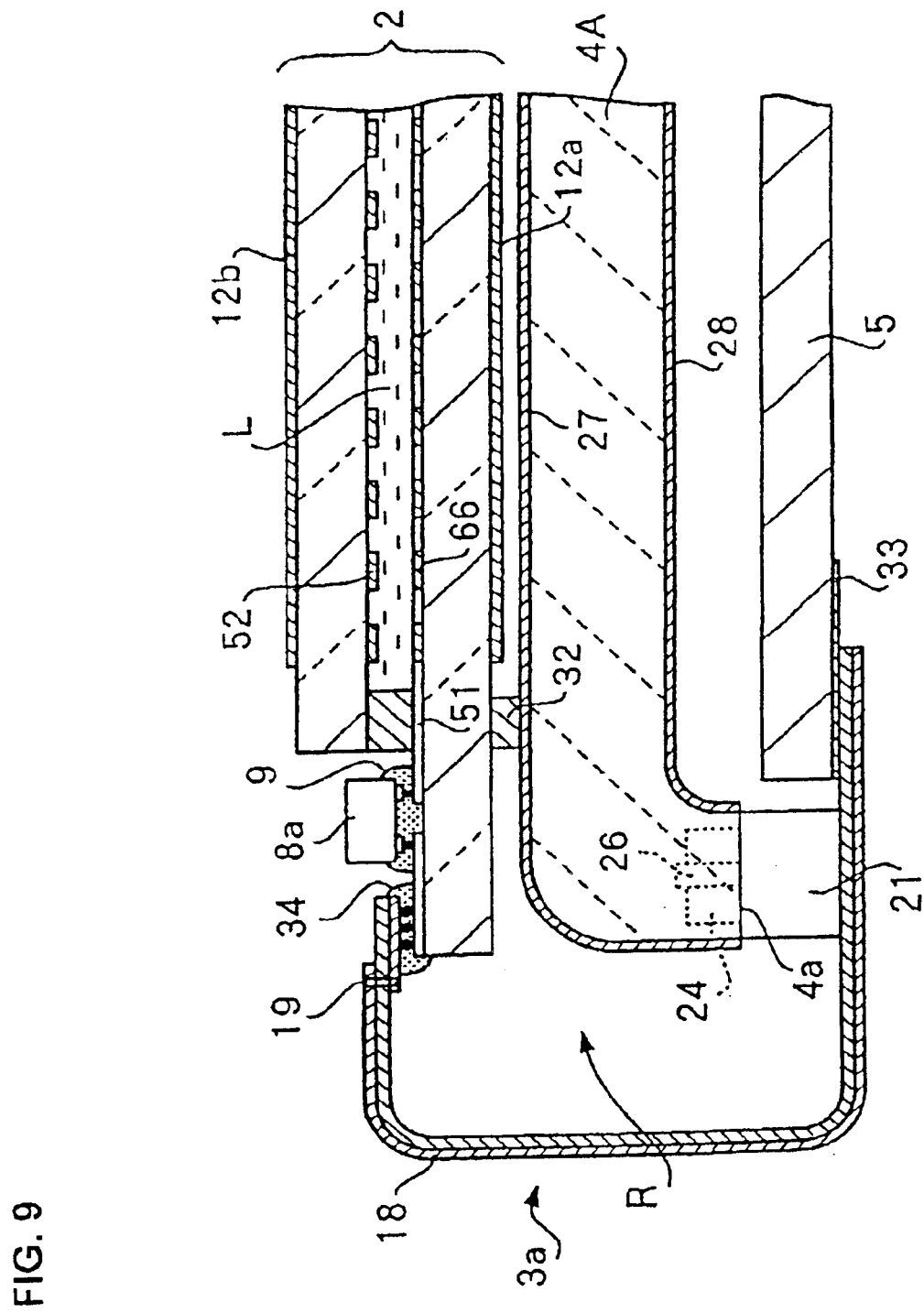
FIG. 9 is a sectional view showing the principal portion of a liquid crystal device in accordance with still another embodiment of the present invention.

FIG. 9 shows the principal portion of a liquid crystal device in accordance with still another embodiment of the present invention. In this embodiment, the same members as those shown in FIGS. 1 and 2 are denoted by the same reference numerals, and the description thereof is omitted. The construction not shown in FIG. 9 is the same as that of the embodiment shown in FIGS. 1 and 2.

This embodiment is different from the embodiment shown in FIG. 2 in that a light guide 4A is formed in a bent shape so that the light receiving surface 4a faces to the direction opposite to the liquid crystal panel 2, and the light emitting surfaces 24 of the LEDs 21 supported by the FPC 3a are arranged opposite to the bent light receiving surface 4a with the FPC 3a conductively connected to the terminals 33 of the control substrate 5.

In this embodiment, a wide space R can be formed between the light guide 4A and the FPC 3a so that the space R can be desirably used for containing, for example, a chip capacitor and other electronic parts mounted on the FPC 3a.

Figure 10:
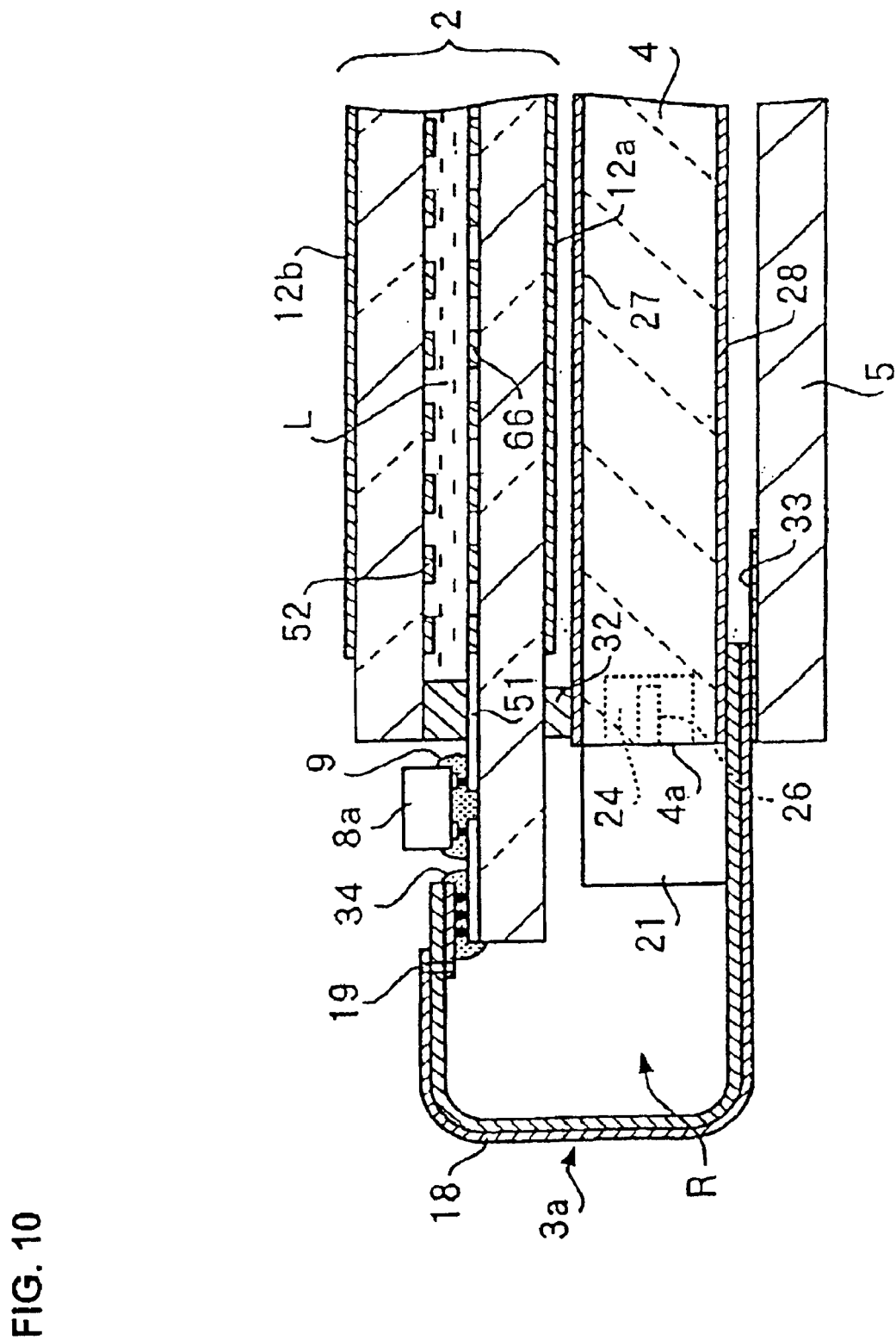
FIG. 10 is a sectional view showing the principal portion of a liquid crystal device in accordance with a further embodiment of the present invention.

FIG. 10 shows the principal portion of a liquid crystal device in accordance with a further embodiment of the present invention. In this embodiment, the same members as those shown in FIGS. 1 and 2 are denoted by the same reference numerals, and the description thereof is omitted. The construction not shown in FIG. 10 is the same as that of the embodiment shown in FIGS. 1 and 2.

This embodiment is different from the embodiment shown in FIG. 2 in that the light emitting surfaces 24 of the LEDs 21 are located at the sides of the surfaces mounted to the FPC 3a, and the FPC 3a is conductively connected to the terminals 33 of the control substrate 5 so that the light emitting side surfaces 24 are arranged opposite to the light receiving surface 4a of the light guide 4.

In this embodiment, a wide space R can be formed between the light guide 4 and the FPC 3a so that the space R can be desirably used for containing, for example, a chip capacitor and other electronic parts mounted on the FPC 3a.

Figure 7B:
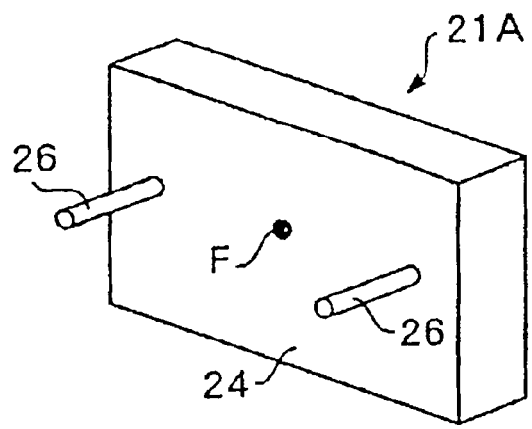

FIG. 7(b) shows a modified example 21A of the LED as the light emitting device. The LED 21A is different from the LED 21 shown in FIG. 7(a) in that the light emitting surface 24 around the light emission point F is a plane surface.

Figure 7C:
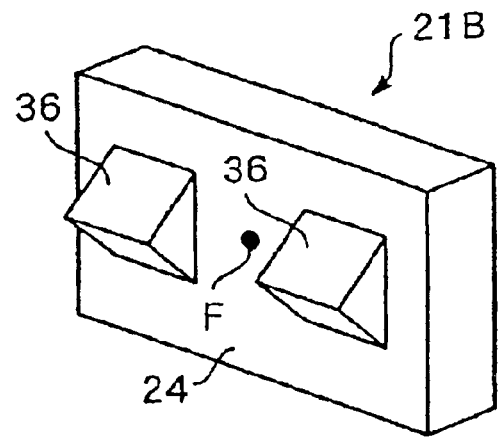

FIG. 7(c) shows another modified example 21B of the LED as the light emitting device. The LED 21B is different from the LED 21 shown in FIG. 7(a) in that the light emitting surface 24 around the light emission point F is a plane surface, and triangular prism protrusions 36 are used as the positioning means in place of the pins 26.

Figure 11:
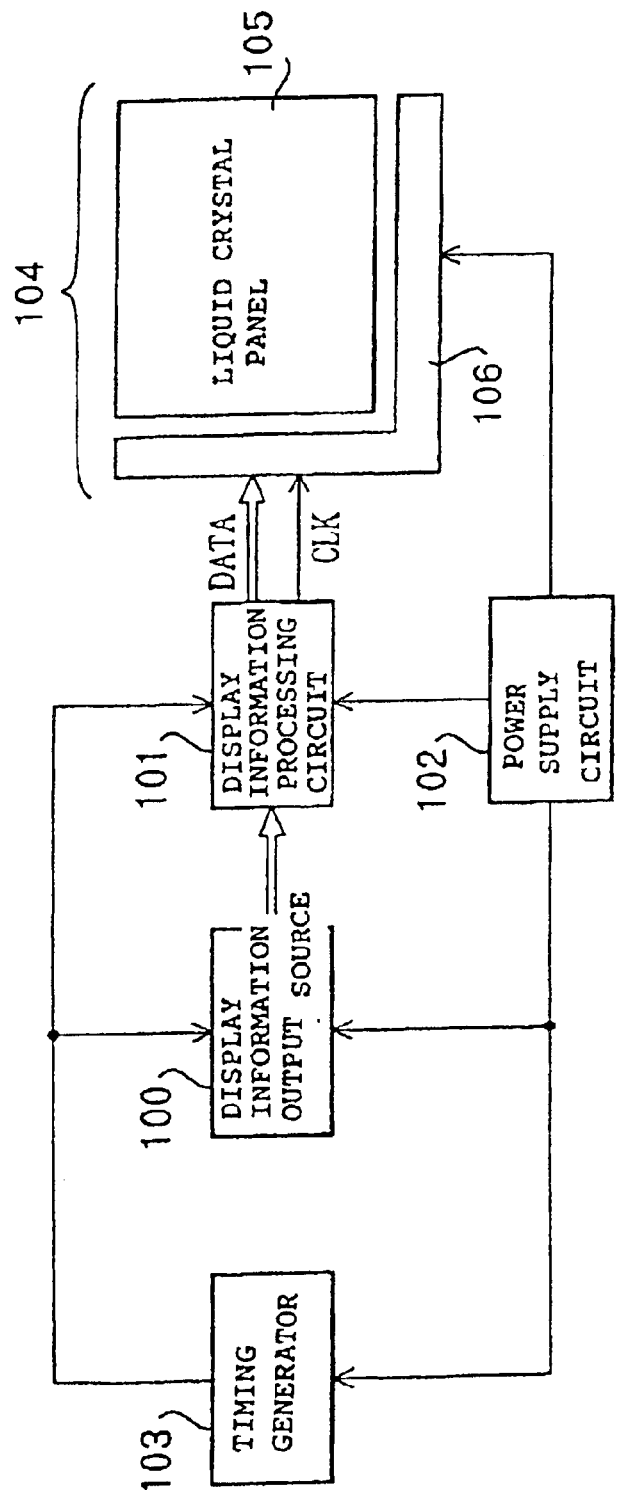
FIG. 11 is a block diagram showing the display control system of an electronic device in accordance with an embodiment of the present invention.

FIG. 11 shows an embodiment in which the liquid crystal device of the present invention is used as a display device of any one of various electronic devices. The electronic device shown in FIG. 11 comprises a display information output source 100, a display information processing circuit 101, a power source circuit 102, a timing generator 103, and a liquid crystal device 104. The liquid crystal device 104 comprises a liquid crystal panel 105 and a driving circuit 106. The liquid crystal device 1 shown in FIG. 1 can be used as the liquid crystal device 104, and the liquid crystal panel 2 shown in FIG. 1 can be used as the liquid crystal panel 105.

The display information output source 100 comprises memory such as ROM (Read Only Memory), RAM (Random Access Memory), a storage unit such as any of various disks, a tuning circuit for tuning and outputting a digital image signal so that display information such as an image signal in a predetermined format is supplied to the display information processing circuit 101 based on a clock signal produced by the timing generator 103.

The display information processing circuit 101 comprises various known circuits such as a serial-parallel conversion circuit, an amplification-inversion circuit, a rotation circuit, a gamma correction circuit, a clamp circuit, etc., to process the input display information to supply the image signal to the driving circuit 106 together with the clock signal CLK. The driving circuit 106 is a general term for the scanning line driving circuit 57, the data line driving circuit 58, and an inspection circuit, and the like shown in FIG. 3. The power source circuit 102 supplies predetermined electric power to each of the components.

Figure 12:
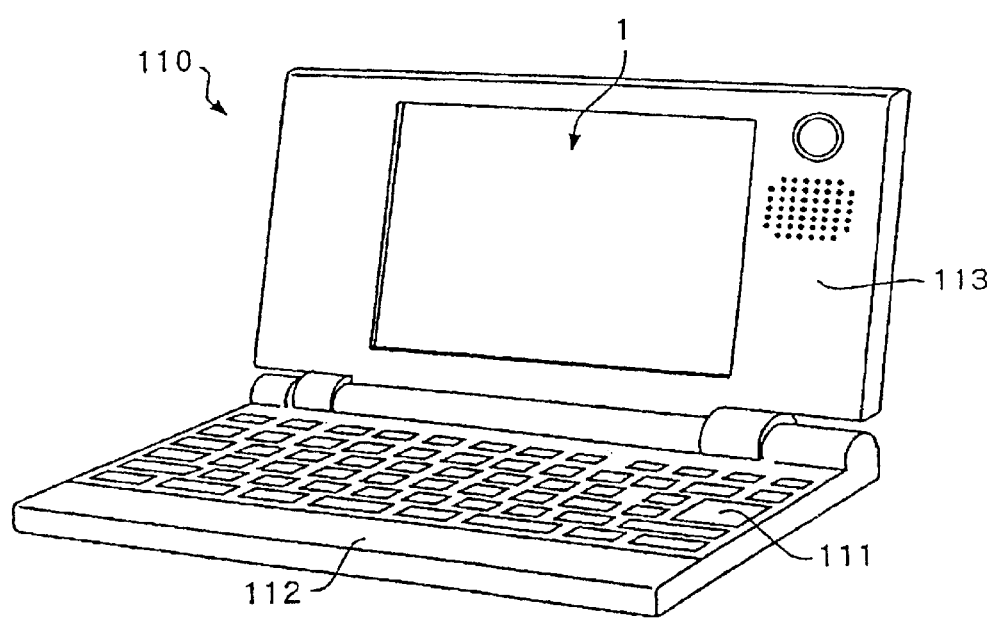
FIG. 12 is a perspective view showing an electronic device in accordance with an embodiment of the present invention.
Figure 13:
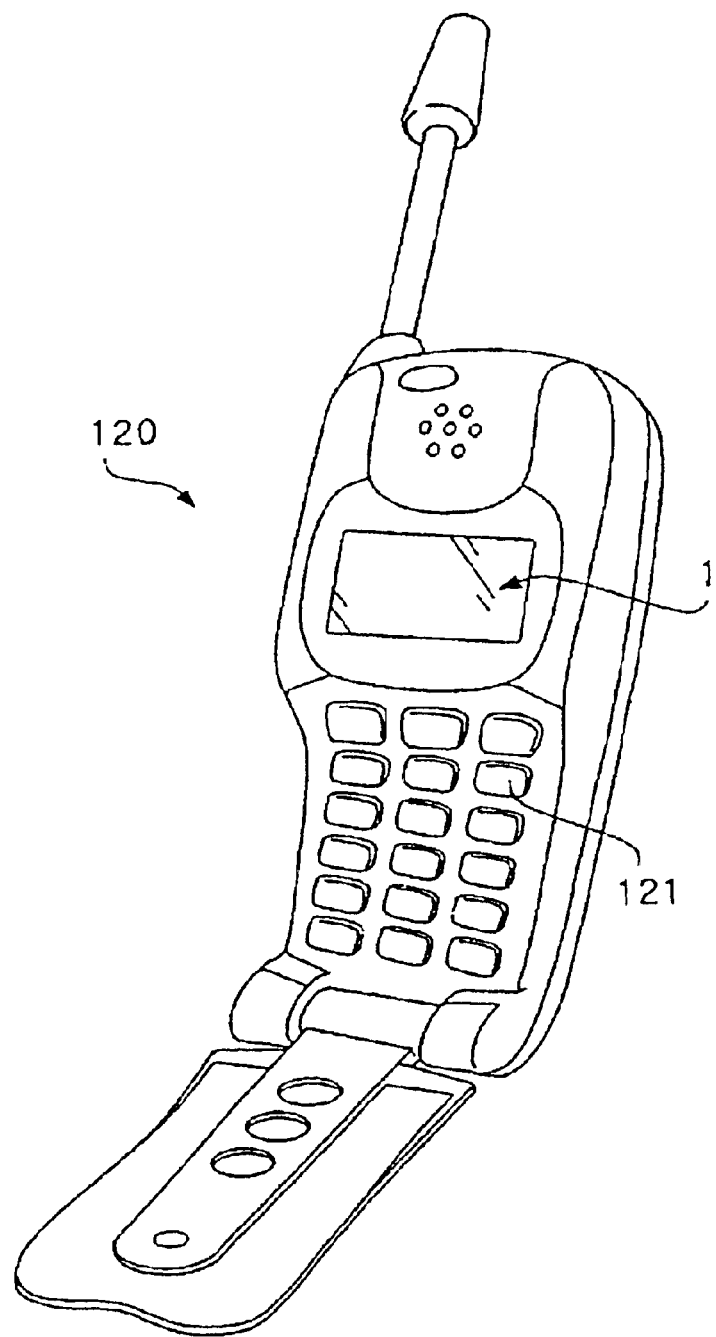
FIG. 13 is a perspective view showing an electronic device in accordance with another embodiment of the present invention.

FIG. 12 shows a mobile personal computer as an electronic device in accordance with an embodiment of the present invention. The personal computer 110 shown in FIG. 12 comprises a body 112 with a keyboard 111, and a liquid crystal display unit 113. The liquid crystal display unit 113 comprises the liquid crystal device 1 shown in FIG. 1. FIG. 13 shows a cell phone as an electronic device in accordance with another embodiment of the present invention. The cell phone 120 shown in FIG. 13 comprises a plurality of operating buttons 121, and the liquid crystal device 1.

Since the liquid crystal device 1 used in the embodiment shown in each of FIGS. 12 and 13 is the transflective liquid crystal device, as described above with reference to FIG. 1, a display can be seen without any trouble by lighting the illumination device comprising the LEDs 21 and the light guide 4, i.e., a back light, even when the computer or cell phone is placed in a portion with insufficient external light.

In the liquid crystal device 1 shown in FIG. 1, the LEDs 21 are supported by the FPC 3a for achieving electric connection between the liquid crystal panel 2 and the control substrate 5 to eliminate a dedicated substrate for supporting the LEDs 21, thereby greatly simplifying the supporting structure for the LEDs 21. Therefore, the liquid crystal 1 can be miniaturized, and incorporated into the liquid crystal display unit 113 shown in FIG. 12 to enable the formation of a narrow frame, i.e., a narrow frame region, of the liquid crystal display unit 113. In regard to the cell phone 120 shown in FIG. 13, miniaturization of the liquid crystal device 1 permits the incorporation of a large display region even when the outer size of the cell phone is decreased.

In FIG. 2, the LEDs 21 are always positioned at the constant positions relative to the light receiving surface 4a of the light guide 4 by engagement between the pins 26 and the recesses 31, and the positions are prevented from deviating relative to the light guide 4 during use of the liquid crystal device 1, thereby removing variation in display brightness of the liquid crystal device 1 from product to product. Therefore, The display screens of the computer shown in FIG. 12, and the cell phone 120 shown in FIG. 13 have no variation in brightness from product to product, and thus uniform display performance can be obtained.

Although the present invention is described above with reference to the preferred embodiments, the present invention is not limited to these embodiments, and various modifications can be made within the scope of the claims.

For example, in the embodiment shown in FIG. 1, the present invention is applied to an active matrix liquid crystal device of a transflective type using TFDS. However, the present invention can be applied to other various types of liquid crystal devices, such as a reflective liquid crystal device, a transmissive liquid crystal device, an active matrix liquid crystal device using switching elements other than TFDs, a passive matrix liquid crystal device not using switching elements.

As described above, a liquid crystal device of the present invention comprises a light emitting device provided on a flexible substrate connected to one of substrates which hold a liquid crystal therebetween, and the flexible substrate is used for some electric wiring for the liquid crystal, not used as a dedicated substrate for mounting the light emitting device on a light guide. Therefore, the supporting structure for the light emitting device can be significantly simplified to achieve cost reduction and miniaturization of the liquid crystal device.

What is claimed is:

1. A liquid crystal device comprising:
   a pair of substrates holding a liquid crystal therebetween;
   a light guide provided opposite to one of the substrates, the light guide having a light receiving surface including a recessed portion formed therein;
   a flexible substrate connected to one of the substrates and having a bent shape with an inner surface on an inner side of the bent shape; and
   a light emitting device mounted on the flexible substrate and the flexible substrate being bent around a light receiving surface of the light guide, the light emitting device disposed on the inner surface of the flexible substrate;
   wherein a light emitting surface of the light emitting device includes a light emission point and a projection portion, the light emission point confronting the light receiving surface, the projection portion being disposed at a position other than where the light emission point confronts the light receiving surface of the light guide, and the bent shape of the flexible substrate locates the projection portion of the light emitting surface in the recessed portion of the light receiving surface for mounting the light emitting device to the light receiving surface of the light guide.

2. The liquid crystal device according to claim 1, wherein the projecting portion comprises a cylindrical pin or a triangular prism projection.

3. The liquid crystal device according to claim 1, wherein the flexible substrate has a terminal to be connected to one of the substrates, the light emitting device is provided on the same surface of the flexible substrate as the surface where the terminal is provided, and a wiring pattern is provided on the surface opposite to the surface where the light emitting device is provided, the wiring pattern being connected to the terminal through a through hole.

4. The liquid crystal device according to claim 1, wherein the flexible substrate has a terminal to be connected to the substrate, a wiring pattern is formed on the same surface as the surface on which the terminal is provided, and the light emitting device is provided on the same surface of the flexible substrate as the surface on which the wiring pattern is provided.

5. The liquid crystal device according to claim 4, wherein the wiring pattern is provided on the flexible substrate so as to avoid the light emitting device.

6. The liquid crystal device according to claim 1, wherein the light emitting surface is at on the side of the mounted surface of the light emitting device to the flexible substrate, and the light emitting surface is mounted to the light receiving surface of the light guide.

7. The liquid crystal device according to claim 1, wherein the light guide is formed in a bent shape so that the light receiving surface thereof faces a direction opposite to the pair of substrates, and the light emitting surface of the light emitting device faces the light receiving surface and the pair of substrates.

8. The liquid crystal device according to claim 1, wherein the flexible substrate supplies a signal for driving the liquid crystal.

9. An electronic device comprising:
   a liquid crystal device; and
   a control circuit for controlling an operation of the liquid crystal device;
   wherein the liquid crystal device is a liquid crystal device in accordance with claim 1, and the flexible substrate is connected to the control circuit so that the light emitting device is mounted to the light receiving surface of the light guide with the control circuit connected to the flexible substrate.

10. A liquid crystal device comprising:
    a pair of substrates holding a liquid crystal therebetween;
    a light guide provided opposite to one of the substrates, the light guide having a light receiving surface including a recess formed therein;
    a flexible substrate connected to one of the substrates and having a bent shape with an inner surface on an inner side of the bent shape; and
    a light emitting device mounted on the flexible substrate, the flexible substrate being bent around the light receiving surface of the light guide, and the light emitting device being disposed on the inner surface of the flexible substrate;

wherein a light emission point and a projecting portion are formed on a light emitting surface of the light emitting device, the light emission point confronting the light receiving surface, and the projection portion being disposed at a position other than where the light emission point confronts the light receiving surface of the light guide; and the bent shape of the flexible substrate locates the projecting portion towards the light receiving surface such that the projecting portion engages with the recessed portion.

* * * * *